July 19, 1949.  J. G. HARDMAN  2,476,727
FOLDING STROLLER
Filed Nov. 23, 1946  2 Sheets-Sheet 1
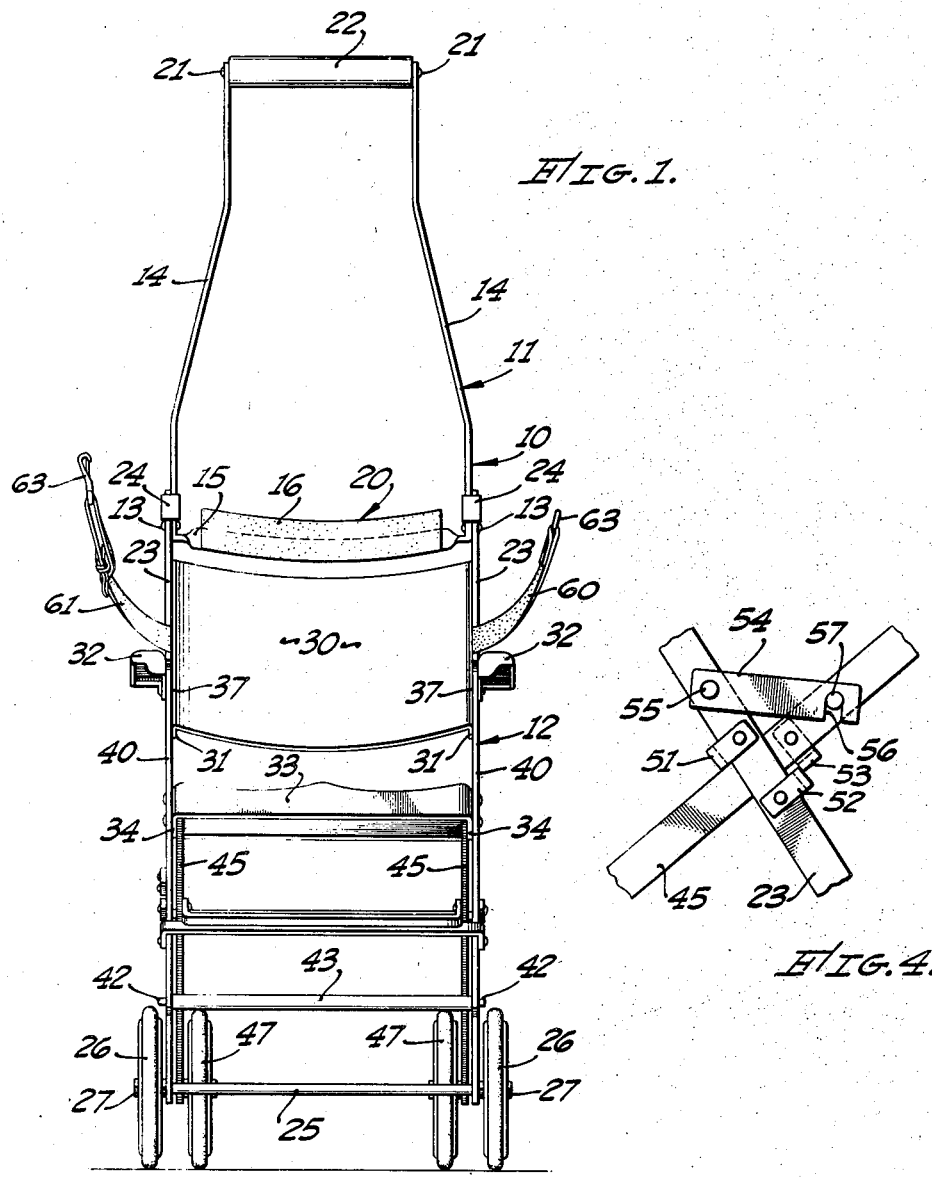
JAMES G. HARDMAN,
INVENTOR.
BY Edmond F. Shanahan
ATTORNEY.

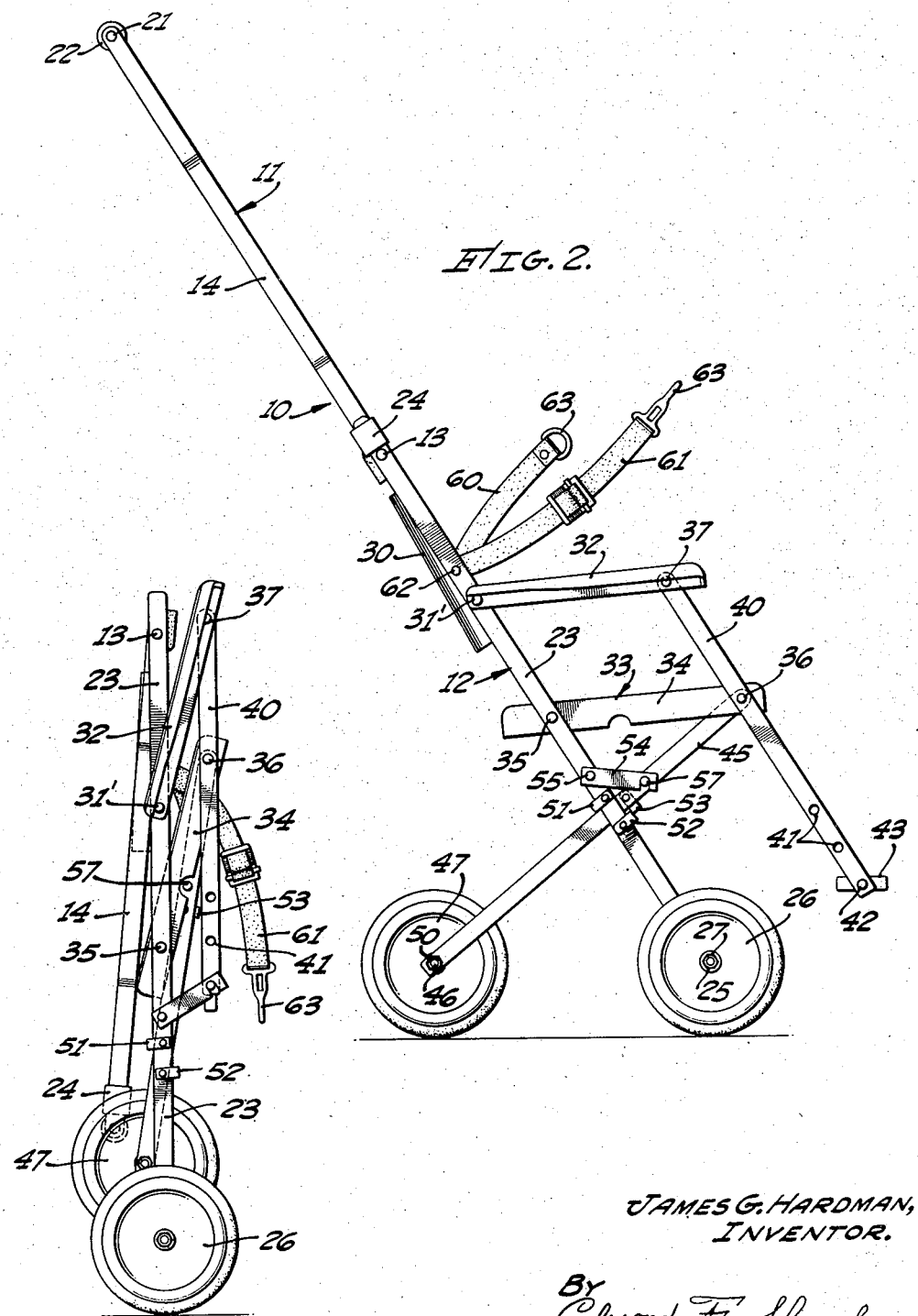

Patented July 19, 1949

2,476,727

UNITED STATES PATENT OFFICE 2,476,727

FOLDING STROLLER

James G. Hardman, Los Angeles, Calif.

Application November 23, 1946, Serial No. 712,002

6 Claims. (Cl. 280—41)

The present invention relates to folding strollers and has as its primary object the provision of a stroller which is simple and inexpensive to manufacture, rugged in construction, and capable of being collapsed to a compact form for ease of carrying and for storage in the minimum of space.

Another object of the invention is to provide a folding stroller having a back section formed of hinged top and bottom frames, the top frame including a handle bar at one end and a head rest at the other end, and said head rest forming a carrying handle for the collapsed stroller when the top frame is folded down relative to the bottom frame.

A further object of the invention is to provide a collapsible stroller having a pair of relatively movable legs and a foot rest support, with a latch mounted on one of said legs and engageable alternatively with a catch on the other leg to lock the stroller in extended relationship, or with a catch on said foot rest to lock the stroller in collapsed condition.

Still another object of the invention is to provide a stroller having crossed front and rear wheel support bars, with the front wheel support bars, foot rest support bars, seat, and arm rests pivotally connected together to form a parallelogram, and with the said rear wheel support bars pivotally connected to the foot rest support bars and slidable with respect to said front wheel support bars, whereby the several parts can be folded up and drawn together without interference with one another into a compact unit occupying the minimum of space.

The foregoing and other objects and advantages of the present invention will become apparent to those skilled in the art upon consideration of the following detail description of the preferred embodiment, reference being had to the accompanying drawings, in which:

Figure 1 is a front elevational view of a stroller embodying the principles of the invention, the stroller being shown in its extended condition;

Figure 2 is a side elevational view of the same;

Figure 3 is a side view of the stroller when folded to its collapsed condition; and Figure 4 is an enlarged fragmentary view of a detail.

The stroller will be described now with reference to its extended condition, as shown in Figures 1 and 2, and is seen to comprise a downwardly and forwardly extending back section 10 which includes a handle frame 11 and a back rest frame 12 hinged together by pivots 13. The handle frame 11 forms the top portion of the back section 10 and is made up of a generally U-shaped strap or bar, the arms 14 of which extend upwardly from the pivots 13 and converge for a portion of their length so that the upper ends thereof are somewhat closer together than the lower ends. The cross piece 15 of the U-shaped bar is twisted 90 degrees with respect to its end portions and is curved slightly toward the rear. A sponge rubber pad 16 is wrapped around and cemented to the cross piece 15 to form a cushioned headrest 20 for the child riding in the stroller. Extending transversely between the arms 14 of the frame 11 and secured thereto by screws 21 is a handle 22, by means of which the stroller is propelled.

The back rest frame 12 comprises two laterally spaced front wheel support bars 23 which are disposed to the outside of the handle frame 11 and serve as extensions of the arms 14 thereof when the stroller is extended. The top ends of the bars 23 project for a short distance above the pivots 13 and are engageable by sliding catches 24 to lock the top and bottom frames 11 and 12 in extended position, as shown in Figures 1 and 2. The catches 24 are preferably in the form of rectangular loops of bar stock which slidably embrace the arms 14 and are shaped and proportioned for a snug fit over the extended ends of the bars 23.

Extending transversely between the bottom ends of the bars 23 and through suitable holes therein is a front axle 25, the ends of which project laterally beyond the bars and have rubber-tired wheels 26 journaled thereon. Nuts 27 are threaded on the outer ends of the axle 25 to retain the wheels 26.

A generally rectangular sheet metal back rest 30 extends across the back of the frame 12 near the top end thereof and is provided with rearwardly bent flanges 31 along its side edges which lie against and are riveted to the bars 23. The back rest 30 is preferably curved slightly to the rear for comfortable fit to the back of the child riding in the stroller.

Pivotally connected to the outside of the frame bars 23 as by rivets 31' are two forwardly extending arm rests 32 which are preferably stamped from sheet metal and formed with smoothly rounded surfaces. Spaced downwardly from the arm rests 32 is a rectangular seat 33 which is likewise stamped from sheet metal and formed with smoothly rounded edges for comfort. Downwardly turned flanges 34 are provided along the side edges of the seat, and these flanges bear against the inside surfaces of the bars 23 and are pivotally connected thereto by rivets 35.

Both the seat 33 and arm rests 32 are connected to the bars 23 near their rear ends, and the front ends thereof are pivotally connected by rivets 36 and 37 to downwardly and forwardly extending foot rest support bars 40 which are disposed parallel to the bars 23. The support bars 40 extend for a distance below the seat 33 and are pierced by a plurality of longitudinally spaced holes 41 which are adapted to receive dowel pins 42 projecting from the ends of a hardwood foot rest bar 43. In the illustrative embodiment I have shown three holes 41 in each of the bars 40, permitting the foot rest bar 43 to be set at any one of three levels to accommodate the increasing length of the child's legs as it grows. The dowel pins 42 are merely seated in the holes 41, and may be removed for adjustment by springing the bars 40 outwardly to clear the ends of the pins.

Two laterally spaced rear wheel support bars 45 are arranged with their front ends lying against the inside faces of the seat flanges 34 and are swingably connected to both the seat and foot rest support bars 40 by the rivets 36. The rear wheel support bars 45 extend downwardly and rearwardly and are crossed with respect to the front wheel support bars 23. At their bottom ends the bars 45 are apertured to receive a transversely extending rear axle 46 having rear wheels 47 journaled thereon inside the bars 45. Nuts 50 are threaded onto the outer ends of the axle 46 to secure the latter to the bars 45.

Two transversely extending bracing members 51 and 52 are fixed to the front wheel support bars 23 and are spaced apart sufficiently to permit the bars 45 to pass between them. Another bracing member 53 is attached at its ends to the bars 45 and is engageable with the lower bracing member 52 when the stroller is extended, to limit rearward sliding movement of the bars 45 with respect to the bars 23. A latch 54 is pivoted at 55 on the right hand bar 23 above the bracing member 51 and is provided with a notch 56 in its free end which is engageable with a catch 57 projecting laterally from the outside face of the right hand bar 45 to limit forward sliding movement of the bar 45 and lock the stroller in extended position. The latch 54 is also engageable with the foot rest dowel pin 42 projecting laterally beyond the outside face of the foot rest support bar 40 to lock the stroller in collapsed position, as shown in Figure 3.

A pair of strap portions 60 and 61 are riveted at 62 to the side bars 23 and are provided with suitable buckles 63 to confine the child to the stroller.

When the stroller is in the extended position shown in Figures 1 and 2, the latch 54 is in engagement with the catch 57, and the two sliding loops 24 are telescopically engaged over the top ends of the bars 23 to lock the handle frame 11 in extended position. To collapse the stroller, the two loops 24 are lifted up to clear the ends of the bars 23 and the handle frame 11 is allowed to fold downwardly. The latch 54 is then swung upwardly to free the catch 57 and the front end of the seat 33 is pulled upwardly to collapse the structure. As the seat swings upwardly, the rear wheel support bars 45 slide through the bracing members 51, 52 and then move in to position the rear wheels 47 between and above the front wheels 26. The latch 54 is then swung down to engage the end of the dowel pin 42, thereby locking the stroller in collapsed position. With the stroller thus collapsed, the head rest 20 is used as a carrying handle which is arranged at a convenient height and, because of the sponge rubber pad 16, affords a comfortable grip. Figure 3 illustrates the extremely compact form of the collapsed stroller, which is highly advantageous when transporting the same on crowded public vehicles or when the stroller must be stored in a limited space.

While I have shown and described above in considerable detail what I believe to be the preferred form of the invention, it is to be understood that such details are merely illustrative and that various changes may be made in the shape and arrangement of the several parts without departing from the scope of the invention as defined in the appended claims.

I claim:

1. A stroller comprising a plurality of members connected together for relative movement between extended and collapsed positions, said members including two pairs of crossed wheel support bars carrying front and rear wheels at their lower ends, a pair of spaced bracing members connecting one of the bars in each of said pairs, the other bar extending between and being slidable through said bracing members, and means for limiting the sliding movement of said other bars through said bracing members.

2. A stroller comprising a plurality of members connected together for relative movement between extended and collapsed positions, said members including two pairs of crossed wheel support bars carrying front and rear wheels at their lower ends, a pair of spaced bracing members connecting one of the bars in each of said pairs, the other bar extending between and being slidable through said bracing members, and a cross piece fixed to said other bars and engageable with one of said bracing members to limit the sliding movement of said other bars through the bracing members.

3. A stroller comprising a plurality of members connected together for relative movement between extended and collapsed positions, said members including two pairs of crossed wheel support bars carrying front and rear wheels at their lower ends, a pair of spaced bracing members connecting one of the bars in each of said pairs, the other bar extending between and being slidable through said bracing members, a cross piece fixed to said other bars and engageable with one of said bracing members to limit the sliding movement of said other bars in one direction, and a latch pivoted on said one bar and engageable with a catch on said other bar to lock the latter against movement in the other direction.

4. A stroller comprising a plurality of frame members connected together for relative movement between extended and collapsed positions, said members including two pairs of crossed wheel support bars carrying front and rear wheels at their lower ends, one of said bars in each of said pairs being slidable with respect to the other, and a latch pivoted on one of said bars and engageable alternatively with a catch on said other bar to lock the stroller in extended position, or with a catch on another frame member to lock the stroller in collapsed position.

5. A stroller comprising a plurality of frame members connected together for relative movement between extended and collapsed positions, said members including a pair of foot rest support bars and two pairs of crossed wheel support bars carrying front and rear wheels at their lower ends, one of said wheel support bars in each of said pairs being slidable with respect to the other, and a latch pivoted on said other wheel support bar and engageable alternatively with a catch on said slidable wheel support bar to lock the stroller in extended position, or with a catch on said foot rest support bar to lock the stroller in collapsed position.

6. A stroller comprising a plurality of members connected together for relative movement between extended and collapsed positions, said members including a back rest frame having a pair of laterally spaced side members carrying front wheels at their lower ends, a generally U-shaped handle frame disposed between said side members and pivotally connected thereto near their upper ends, said handle frame including a cross bar adjacent said pivotal connection serving as a head rest when the stroller is extended and as a carrying handle when the stroller is collapsed, a pair of catches slidable on the arms of said handle frame and engageable with the ends of said side members to lock said handle frame in extended position, a seat pivotally connected adjacent its rear end to said side members, a pair of arm rests pivoted to said side members above said seat and arranged parallel thereto, a pair of laterally spaced foot rest support bars disposed parallel to said side members and pivotally connected to the front ends of said arm rests and said seat to form a parallelogram, a pair of rear wheel support bars connected to said foot rest support bars at the pivotal connection of said seat therewith, said rear wheel support bars being crossed with respect to said side members and slidable relative thereto, means limiting the sliding movement of said rear wheel support bars in one direction, and a latch pivoted on said side members and engageable alternatively with a catch on said rear wheel support bars to lock the stroller in extended position or with a catch on said foot rest support bars to lock the stroller in collapsed position.

JAMES G. HARDMAN.

REFERENCES CITED

The following references are of record in the file of this patent:

UNITED STATES PATENTS

| Number | Name | Date |
|---|---|---|
| 1,695,409 | Banks | Dec. 18, 1928 |
| 2,171,013 | Stinson | Aug. 29, 1939 |
| 2,301,640 | Peltier | Nov. 10, 1942 |
| 2,419,790 | Peltier | Apr. 29, 1944 |